US012555045B1

(12) United States Patent
Lev et al.

(10) Patent No.: US 12,555,045 B1
(45) Date of Patent: Feb. 17, 2026

(54) GRADIENT-BASED MODEL MERGING (71) Applicant: Intuit Inc., Mountain View, CA (US)

(72) Inventors: Guy Lev, Giv'atayim (IL); Matan Vetzler, Ramat Gan (IL); Shai Ardazi, Petach Tikva (IL); Linoy Cohen, Ramat Gan (IL)

(73) Assignee: INTUIT INC., Mountainview, CA (US)

( * ) Notice: Subject to any disclaimer, the term of this patent is extended or adjusted under 35 U.S.C. 154(b) by 0 days.

(21) Appl. No.: 19/194,437

(22) Filed: Apr. 30, 2025

(51) Int. Cl.
*G06N 20/00* (2019.01)
*G06F 16/3329* (2025.01)

(52) U.S. Cl.
CPC ....... *G06N 20/00* (2019.01); *G06F 16/33295* (2025.01)

(58) Field of Classification Search
CPC .......................... G06F 16/33295; G06N 20/00
See application file for complete search history.

(56) References Cited

U.S. PATENT DOCUMENTS

| | | | | |
|---|---|---|---|---|
| 11,132,602 | B1* | 9/2021 | Xie | G06F 9/44552 |
| 11,443,169 | B2* | 9/2022 | Kurata | G06N 3/047 |
| 12,135,949 | B1* | 11/2024 | Cameron | G06F 40/40 |
| 12,154,019 | B1* | 11/2024 | Cameron | G06N 3/045 |
| 12,211,598 | B1* | 1/2025 | Aravamudan | G16H 10/20 |
| 2020/0252198 | A1* | 8/2020 | Nandakumar | G06N 3/084 |
| 2020/0366459 | A1* | 11/2020 | Nandakumar | G06F 21/602 |
| 2021/0034985 | A1* | 2/2021 | Vongkulbhisal | G06F 16/908 |
| 2021/0287114 | A1* | 9/2021 | Zhou | G06N 20/20 |
| 2021/0383280 | A1* | 12/2021 | Shaloudegi | G06F 17/18 |
| 2022/0076133 | A1* | 3/2022 | Yang | G06N 3/044 |
| 2022/0156579 | A1* | 5/2022 | Kim | G06F 40/216 |
| 2022/0180061 | A1* | 6/2022 | Kim | G06N 20/00 |
| 2022/0284315 | A1* | 9/2022 | Lee | G06N 20/00 |
| 2023/0080674 | A1* | 3/2023 | Attali | G06F 40/56 |
| 2023/0162023 | A1* | 5/2023 | Koike Akino | G06N 3/0455 706/25 |
| 2023/0252284 | A1* | 8/2023 | Amada | G06N 3/094 706/21 |
| 2023/0328075 | A1* | 10/2023 | Almasan | H04L 63/1416 |
| 2023/0385694 | A1* | 11/2023 | Cresswell | G06N 20/00 |
| 2024/0064611 | A1* | 2/2024 | Xu | H04W 48/02 |
| 2024/0064793 | A1* | 2/2024 | Ashour | H04W 76/14 |
| 2024/0242087 | A1* | 7/2024 | Castiglia | G06N 3/098 |
| 2024/0256782 | A1* | 8/2024 | Stremmel | G06N 20/00 |
| 2024/0320513 | A1* | 9/2024 | Sun | G06N 3/098 |

(Continued)

*Primary Examiner* — Jeremy L Stanley
(74) *Attorney, Agent, or Firm* — Dinsmore & Shohl LLP (57) ABSTRACT

Certain aspects of the disclosure provide techniques for model merging. A method may include, for each respective model of multiple models trained for multiple domains: processing a multiple questions to generate multiple predicted answers; for each respective predicted answer: generating a gradient vector indicating, for each weight of the respective model, a weight change that is needed to minimize a loss value, the loss value being based on the respective predicted answer and an incorrect answer to the respective question; and summing each gradient vector for each respective answer to generate a final gradient vector for the respective model; and combining, based on the final gradient vector generated for each respective model, at least one weight of the weight(s) associated with each respective model of the multiple models to obtain a single merged model associated with the plurality of domains.

20 Claims, 5 Drawing Sheets

(56) References Cited

U.S. PATENT DOCUMENTS

| | | | | |
|---|---|---|---|---|
| 2024/0386283 A1* | 11/2024 | Miralles | ............ | G06N 5/01 |
| 2024/0394556 A1* | 11/2024 | Shao | ............ | G06N 3/0985 |
| 2025/0086495 A1* | 3/2025 | Mitra | ............ | G06N 20/00 |
| 2025/0111243 A1* | 4/2025 | Saravanos | ............ | G06N 3/045 |
| 2025/0119251 A1* | 4/2025 | Abasi | ............ | H04W 12/02 |
| 2025/0131321 A1* | 4/2025 | Yu | ............ | G06N 20/00 |
| 2025/0209330 A1* | 6/2025 | Yu | ............ | G06N 3/082 |

* cited by examiner

GRADIENT-BASED MODEL MERGING

BACKGROUND

Field

Aspects of the present disclosure relate to model merging, and more specifically, techniques for combining two or more language models, fine-tuned for different domains and/or fine-tuned to perform different tasks, into a single, unified model.

Description of Related Art

A long-term goal of artificial intelligence (AI) is to create machines capable of understanding and engaging in conversation with humans using natural language. Dialogue systems, which can communicate with users in natural language, may carry out unstructured conversations, with users, on any topic (e.g., open-domain systems). Performant dialogue systems exhibit competence in understanding natural language, making informed decisions, and generating fluent, engaging, contextually appropriate, and accurate responses.

An example dialogue system may leverage language models, such as large language models (LLMs) and/or small language models (SLMs), to perform natural language processing (NLP) tasks. A language model is a type of machine learning (ML) model that supports NLP tasks, such as generating text, analyzing sentiments, answering user queries in a conversational manner, translating text from one language to another, and/or the like. Language models make it possible for software to "understand" typical human speech or written content and respond to it by, in some cases, generating human-understandable responses through natural language generation (NLG). An LLM is a type of language model that has a large number of parameters, such a language model with greater than 100 billion parameters (although, it is noted, that the number of parameters generally associated with an SLM and an LLM may change over time).

A popular LLM model architecture is a generative pre-trained transformer (GPT) model. A GPT model is a specific type of LLM based on a transformer architecture (e.g., architecture that uses an encoder-decoder structure and does not rely on recurrence and/or convolutions to generate an output), that is pre-trained in a generative and unsupervised manner (e.g., it learns from data without being given explicit instructions on what to learn). A GPT model analyzes prompts and predicts the best possible response based on their understanding of the language. In particular, the GPT model may rely on the knowledge it gains after its, in some cases, billions or even trillions of parameters, are trained on massive datasets. As used herein a "prompt," is a specific instruction and/or request, posed in natural language, given to a computer program and/or language model to perform a particular task and/or generate a specific output.

Although a pre-trained language model is, due to the knowledge it encodes, able to perform a variety of tasks, the model may lack specific knowledge that is not encoded in its training data, such as, for example, domain-specific knowledge. "Domain-specific knowledge" (also referred to as "domain-focused knowledge" and/or simply "domain knowledge") in ML refers to expertise and understanding of a specific field or subject matter (referred to herein as a "domain") to which an ML model is applied. Language models may suffer from a domain knowledge deficit where they lack detailed, specialized knowledge for a particular domain, such as finance, healthcare, law, etc.

For example, a general-purpose language model pre-trained on publicly-available data may not be able to respond, or may respond incorrectly, to a domain-specific prompt, such as a prompt requesting information about a company's financial statements and/or accounts, a prompt requesting proprietary software code for an application, a prompt requesting customer help with an application and/or system internal to a company, and/or the like. The pre-trained language model may not be able to respond, or may respond incorrectly, given the information that is requested is not part of a publicly-available training dataset used to pre-train the language model.

To address the shortcomings of general-purpose language models, some conventional approaches seek to combine and orchestrate language model functionality with other sources of knowledge. For example, some conventional approaches use techniques to "fine-tune" language models for specific domains, while also regularly performing updates to their knowledge bases. Fine-tuning language models for specific domains may involve adapting a pre-trained language model to generate domain-specific text and/or initiate or perform domain-specific tasks. This process allows the language model to better understand and generate output (e.g., content or action(s)) that aligns with a particular field or subject matter of interest.

Though fine-tuning techniques for integrating additional knowledge may be useful for broadening the utility and effectiveness of language models for particular domains, fine-tuning often requires a significant amount of time and compute resources, and, in some cases, may create an inherent latency with respect to deploying updated language models. Furthermore, a technical difficulty associated with fine-tuning involves the preparation of performant fine-tuning data. Specifically, the quality and format of the data used for fine-tuning a language model may play an instrumental role in determining the effectiveness of the resulting model.

SUMMARY

Certain aspects provide a method of model merging. For each respective model of a plurality of models trained for a plurality of domains, the method includes: processing a plurality of questions with the respective model to generate a plurality of predicted answers to the plurality of questions; generating, for each respective predicted answer, of the plurality of predicted answers, to each respective question, of the plurality of questions, a gradient vector indicating, for each respective weight of one or more weights of the respective model, a weight change that is needed to minimize a loss value, the loss value being based on the respective predicted answer and an incorrect answer to the respective question; summing each gradient vector for each respective answer to generate a final gradient vector for the respective model, the final gradient vector indicating one or more final weight changes for the one or more weights of the respective model; and combining, based on the final gradient vector generated for each respective model of the plurality of models, at least one weight of the one or more weights associated with each respective model of the plurality of models to obtain a single merged model associated with the plurality of domains.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Model merging offers a solution to overcome the aforementioned technical problems and efficiently enhance language models by combining multiple trained (e.g., fine-tuned) models into a single model that inherits the combined models' capabilities, and in some cases, attains improved performance. The models that are combined into a merged model may be referred to as "constituent models," and may include models that are fine-tuned on different training datasets that cover different tasks and/or domains and therefore may have complementary capabilities. The specific goal of merging may vary for different scenarios, but may include, for example, improving performance on a target task, creating a multi-task model while also retaining the capabilities of each constituent model, and/or generalizing to new tasks. For example, in certain aspects, combining at least two constituent models may create a single merged model that is more robust and adaptable for various applications.

Model merging may be especially beneficial in the context of language models. That is, the need to adapt to new tasks, combine specialized knowledge from different domains, and scale efficiently (e.g., minimize resource usage and costs) while maintaining performance makes model merging an important technique for developing effective language models. Instead of incurring the enormous resource costs in terms of compute, memory, power, and network bandwidth fine-tuning a language model for multiple domains and/or tasks, model merging techniques may enable fine-tuned models to be combined in a fraction of the resources; that is, saving significant time, compute, memory, power, and network bandwidth. Moreover, the resulting, combined model may leverage the diverse expertise and capabilities of their constituent models, enabling the model to competently perform a wider range of tasks and/or domains with greater efficiency and accuracy. Further, model merging of language models may contribute to quicker model deployment than when fine-tuning techniques are used.

Language model merging generally involves combining the weights of at least two trained language models. As used herein, "weights" (also commonly referred to as "parameter weights") refer to the learnable parameters of an ML model (e.g., a language model), which may be adjusted during training to improve the model's ability to generate accurate outputs. Specifically, weights are numerical values assigned to the connections between nodes (or neurons) present in the ML model, which determine the importance or strength of each of the connections (e.g., dictates how much the output of one node influences a next node connected via the specific connection) and thereby have an influence on the final prediction of the ML model. The total number of weights in an ML model may be influenced by various factors, such as the architecture of the model, including the number of layers and/or nodes present in the model. In certain aspects, model merging techniques may need to consider how to handle differing weights associated with connections between the same nodes in different language models (e.g., where the language models have the same architecture) when combining multiple language models into one, unified model.

Trim, elect sign, and merge (TIES) is one example model merging technique that may be used to combine multiple task-specific language models (e.g., belonging to a same family of models) into a multi-task language model. In certain aspects, TIES may be used to address the challenges of parameter interference and redundancy. For example, a base language model may include a an initial set of weights. The base language model may be adapted to perform a first task, thereby creating a first language model with the same architecture (e.g., same number of nodes and layers), but with a first set of weights that is different than the initial set of weights associated with the base language model. Further, the base language model may be adapted to perform a second task, thereby creating a second language model with the same architecture (e.g., nodes and layers) as the base language model, but with a second set of weights that is different than the initial set of weights associated with the base language model. The second set of weights may also be different than the first set of weights. To combine the first language model with the second language model using TIES, three steps may be performed including (1) trimming, (2) sign election, and (3) disjoint merging. During trimming, the top-k % most significant weight changes made during fine-tuning may be identified for each model. The weights in the top-k % may be retained for each of the first and second language models, while the remaining weights in the first and second language models may be dropped or set to zero. During sign election, a unified sign vector may be created to resolve conflicts between the first and second language models, where opposing weight adjustments to the same connection (e.g., between the same two nodes in the language models) are suggested. Finally, disjoint merging may include averaging weights of the language models that are (1) associated with the same connection in each language model and (2) align with the unified sign vector. As such, only weights contributing to the agreed-upon direction of change may be merged, thereby enhancing the coherence and performance of a multi-task model resulting based on the merging performed. Although TIES beneficially provides the aforementioned advantages, technical problems associated with the use of this model merging technique include (1) the requirement of a base model to function, acting as the foundation upon which the merged model is built, and (2) the need for careful hyperparameters tuning to achieve optimal results, which may lead to increased computation and resource costs.

Another popular model merging technique includes linear merge, also known as "model soups," which works to combine models by averaging their weights linearly. Although this technique may, in some cases, prove to be computationally efficient, this technique may fail to identify and prioritize the weights that are most important to the model's domain-specific knowledge, thereby leading to a less effective integration of specialized information.

Further, another popular model merging technique includes drop and rescale (DARE), which focuses on pruning and rescaling weights of constituent models. Specifically, "drop" in DARE may involve randomly sampling, per language model, a subset of weights of the respective model and setting the remaining weights of the respective model to zero. For example, a first subset of weights of a first language model (e.g., adapted to perform a first task and/or for a first domain) may be randomly selected, and the unselected weights of the first language model may be set to zero. Similarly, a second subset of weights of a second language model (e.g., adapted to perform a second task and/or for a second domain) may be randomly selected, and the unselected weights of the second language model may be set to zero. "Rescale" in DARE may involve rescaling the selected weights of each language model, such as to approximate the original weight distributions of each language model (e.g., normalize weights between the two language models prior to merging). A multi-task and/or multi-domain language model may then be created based on merging the remaining weights (e.g., those weights not set to zero) of each model. In certain aspects, at least one weight, not set to zero, may be associated with a same connection (e.g., between the same two nodes) in each of the language models. Thus, different techniques for combining this weight associated with each of the language models, to create the merged model may be considered (e.g., such as weight averaging).

DARE offers an efficient way to merge language models by pruning and rescaling weights, thereby resulting in merged models with enhanced and diverse capabilities without the need for extensive re-training. Further, DARE may help to reduce interference during the merging process by dropping (e.g., during random sampling) redundant parameters (e.g., setting weights to zero), which may degrade performance of the merged model. Technical problems associated with the use of DARE, however, relate to the random selection of weights during its "drop" phase. For example, randomly selecting weights without any criteria and/or strategy may result in the exclusion of domain-sensitive weights associated with each constituent language model. Excluding domain-sensitive weights prior to the creation of the merged model may result in the merged model failing to learn meaningful features, thereby reducing the merged model's ability to perform well for specific tasks and/or domains. Thus, relying on random weight selection for model pruning may yield a merged language model (e.g., a multi-task or multi-domain model) that performs poorly across domains, such as by generating inaccurate, irrelevant, and/or biased outputs.

Aspects described herein overcome the aforementioned technical problems and improve upon the state of the art by introducing techniques for identifying domain-sensitive weights of constituent models, such that these weights may be prioritized and preserved during model merging. As used herein, "domain-sensitive weights" refer to weights of a model that are adjusted during fine-tuning of the model, and which are critical and thus contribute significantly to the model's performance in a particular domain and/or with respect to a particular task. Domain-sensitive weights may include model weights that are highly relevant to model output, for example, weights that significantly influence the accuracy, relevance, and/or quality of the model output.

The techniques described herein may use a gradient-based approach to identify domain-sensitive weights of a model, such as for model merging. For example, the gradient-based approach may include steps for prompting a model, fine-tuned for a particular domain (e.g., a "domain-expert model"), to generate answers to multiple questions associated with the domain. For each answer produced by the model for a particular question, a loss function may be used to compare the answer output by the model to an incorrect answer to the particular question and to compute a loss value. Backpropagation may then be used to calculate a gradient (also referred to herein as "generating a gradient vector") of the loss function with respect to one or more weights of the model. The gradient vector may indicate weight change(s) associated with the model's weight(s), which may be necessary to cause the model to generate the incorrect answer to the particular question (instead of the current answer produced by the model). Each gradient vector generated for each respective answer may be added together to generate a final gradient vector for the model. The final gradient vector of the model may essentially indicate adjustments to the model's weight(s), which may alter the performance of the model, such that the model is less capable of (or no longer capable of) effectively answering the domain-specific questions or performing domain-specific tasks (e.g., a weight update, which may cause the model performance to degrade from "good" to "poor"). In certain aspects, the largest magnitude weight changes included in the final gradient vector generated for the model, and associated with various weights of the model, may indicate domain-sensitive weights of the model that may need to be prioritized during model merging. For example, the largest magnitude weight changes may be associated with the weights of the model that are domain sensitive, i.e., key (or most important) to making the model perform well for the particular domain, thereby highlighting those weights that are most sensitive and relevant to the model's performance in the particular domain. Different merging techniques (e.g., DARE, etc.) may then be used to perform model merging based on the final gradient vector generated for the model, as well as based on final gradient vector(s) generated for other model(s), which may be merged with the model to create a single merged model. For example, in certain aspects, these merging techniques may be used to prioritize one or more of the identified domain-sensitive weights of each constituent model being merged when creating the single merged model.

In certain aspects, the gradient-based model merging techniques described herein may be used to identify and preserve domain-sensitive weights of language models for language model merging. For example, when merging a first language model fine-tuned for a first domain and a second model fine-tuned for a second domain, the techniques described herein may be used to (1) identify domain-sensitive weight(s) of the first language model that enable the first language model to understand and generate text for the first domain, as well as (2) identify domain-sensitive weight(s) of the second language model that enable the second language model to understand and generate text for the second domain. These domain-sensitive weight(s) identified for each model may be considered when determining how to merge weights of the language models, including, in some cases, determining which weight(s) to drop, during model merging. In this example, model merging may be performed to generate a single, multi-domain language model capable of generating text associated with both the first and second domains.

Although aspects herein are described with respect to the use of the gradient-based model merging techniques for language model merging, it is noted that the techniques described herein may be similarly applied to other types of models utilized for various applications and/or in various domains while enjoying the same technical benefits discussed herein.

The gradient-based model merging techniques described herein provide significant technical advantages over conventional approaches, including improving the efficiency of creating models with enhanced and diverse capabilities, as well improving the task and/or domain-specific performance of such models. The increased efficiency may be attributed to the use of model merging techniques, as opposed to fine-tuning techniques, thereby saving time and resources. The improved model performance may be attributed to the creation and use of gradient vectors, during model merging, such that domain-sensitive weights from constituent models are prioritized when creating the merged model, as opposed to using random sampling (e.g., which may, at least in some cases, result in domain-sensitive weights of one or more of the constituent models being dropped, as described in detail above).

Example System Implementing a Model Merging Service

Figure 1:
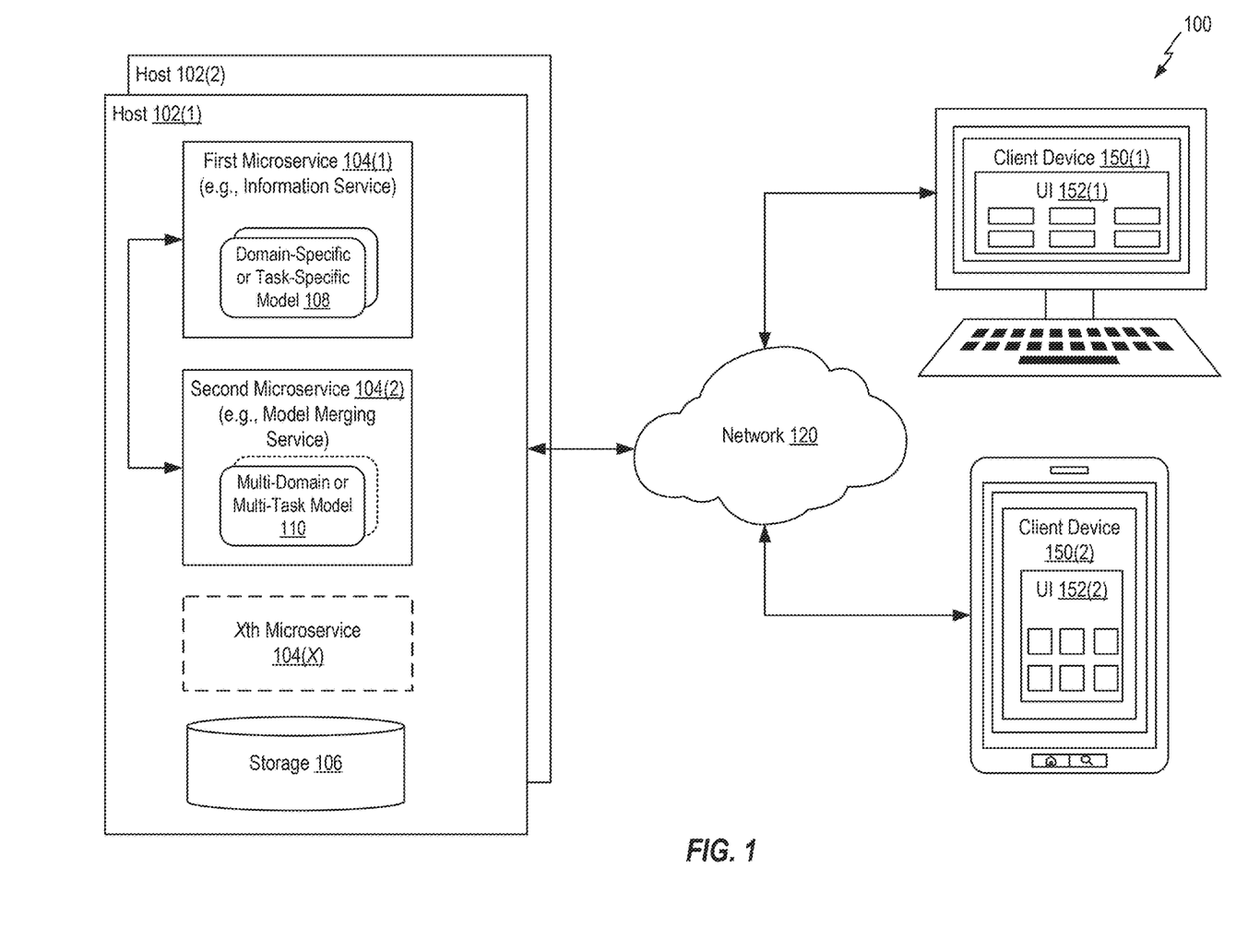
FIG. 1 depicts an example system implementing a model merging service.

FIG. 1 depicts an example system 100 supporting a plurality of microservices 104 (e.g., software-defined services, which in some cases, may be cloud-native). As shown in FIG. 1, system 100 includes client devices 150(1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another microservice 104, through the X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements an information service, which is any network 120 accessible service that maintains financial data (e.g., such as information about invoices, payments, etc.), medical data, personal identification data, and/or other data types. For example, the information service may include TurboTax®. In certain aspects, the information service stores its data in storage 106.

In certain aspects, the first microservice 104(1) implements one or more domain-specific or task-specific models 108 (simply referred to herein as "model(s) 108"). In certain aspects, the model(s) 108 include language models, such as LLMs or SLMs. First microservice 104(1) may implement the language models to provide responses to user prompts, including responses such as answers, advice, and/or help with the preparation of documents and/or reports. For example, TurboTax®, an example information service, may utilize a language model to aid users of the application with preparing one or more financial documents. The language model may provide answers to questions asked by a user of the application, prepare and output one or more reports and/or documents for the user, etc. In certain aspects, the language models implemented by first microservice 104(1) may include language models that are each individually fine-tuned for a particular domain and/or fine-tuned to perform a specific task.

As an illustrative example, one language model may be fine-tuned for the tax domain, such that the language model is capable of generating tax-focused text and/or initiating or performing tax-specific tasks (e.g., such as preparing a user's tax return, etc.). Another language model implemented by first microservice 104(1) may include a language model that is fine-tuned to generate coding-focused text and/or fine-tuned to initiate or perform coding-specific tasks.

In certain aspects, the second microservice 104(2) implements a model merging service. The model merging service may be a service that is used to combine multiple models into a single, unified model. The model merging service may combine multiple models to create multi-domain and/or multi-task model(s) 110 (simply referred to herein as "model(s) 110") that are robust and adaptable for various applications. The model merging service may provide a solution for enhancing model capability without the need for extensive model re-training and/or fine-tuning techniques. In certain aspects, the model merging service uses gradient-based model merging techniques described herein to create model(s) 110.

In certain aspects, the model merging service creates model(s) 110 based on combining two or more of the models 108 implemented by first microservice 104(1), though in general the model merging service may merge any provided models. Using the aforementioned example, the model merging service may combine (1) the language model fine-tuned for the tax domain and (2) the language model fine-tuned for the coding domain to create a model 110 capable of generating tax and coding-focused text and/or initiating or performing tax and coding-specific tasks (e.g., in some cases, simultaneously).

In certain aspects, second microservice 104(2) may make model(s) 110 available for subsequent use by first microservice 104(1).

Though FIG. 1 depicts each of first host 102(1), storage 106, client device 150(1), and client device 150(2) as single devices for case of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Example Workflow for Gradient-Based Model Merging

Figure 2:
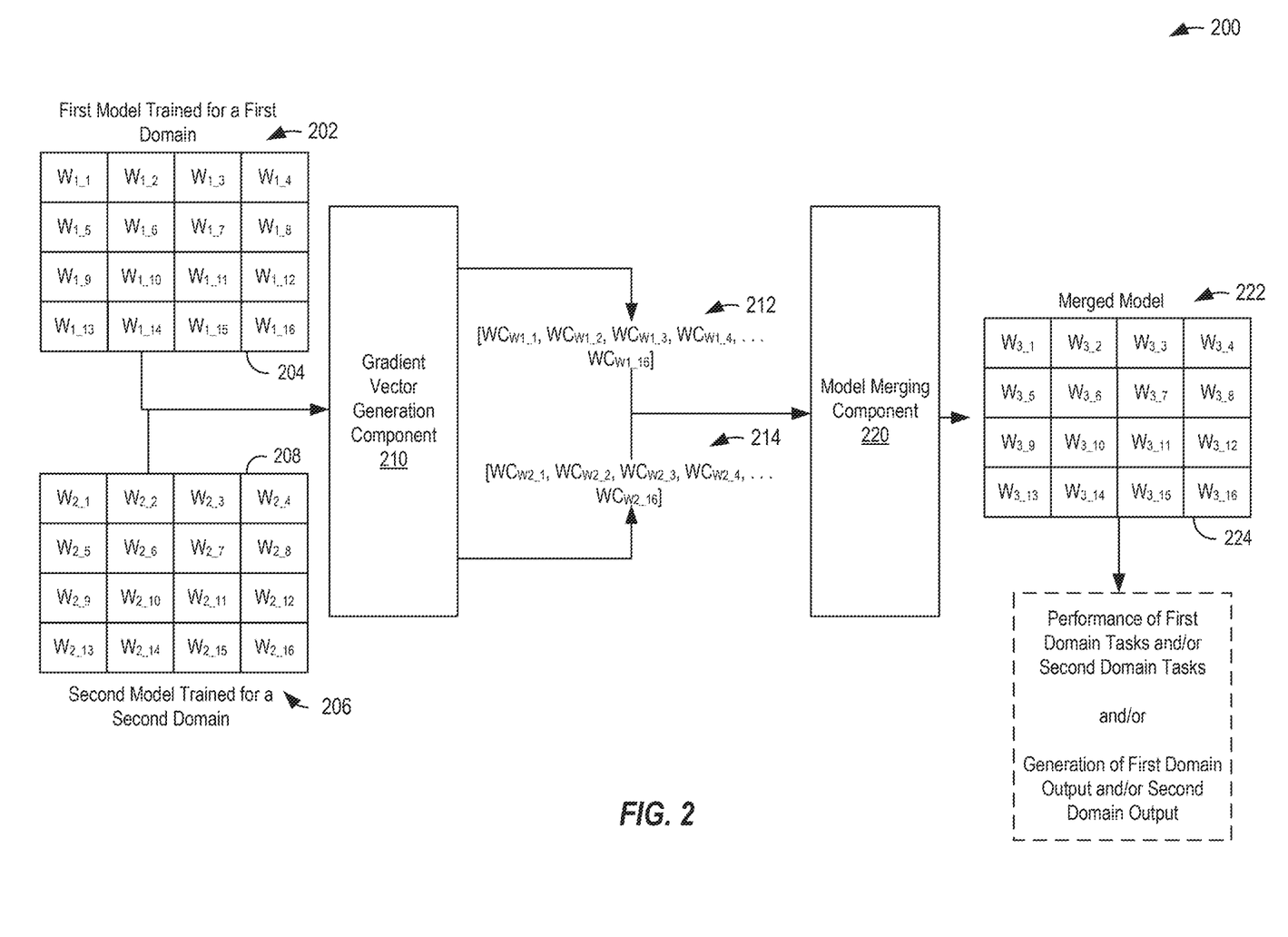
FIG. 2 depicts an example workflow for gradient-based model merging.

FIG. 2 depicts an example workflow 200 for model merging. More specifically, workflow 200 may be used to combine two or more constituent models using gradient-based model merging techniques. The gradient-based model merging techniques may be used to generate a gradient (referred herein to as a "final gradient vector") for each constituent model and use the generated gradients to identify domain-sensitive weights of each constituent model. The domain-sensitive weights identified for each constituent model may represent weights that may be prioritized and preserved for each constituent model during model merging. For example, at least when using DARE merging techniques to merge two constituent models, instead of randomly sampling weights associated with each constituent model, domain-sensitive weights associated with each constituent model may be identified using the gradient generated for each model. One or more of the identified domain-sensitive weights of each constituent model may be combined to generate a single, merged model, while other weight(s) of the constituent models may be dropped and/or disregarded during merging. As a result, the resulting model may include weights that enable the resulting model to effectively perform tasks (e.g., sometimes together) that the constituent models would have otherwise needed to perform separately (e.g., different tasks and/or different domains associated with the different constituent models).

In FIG. 2, workflow 200 is described with respect to the creation of a merged model 222 based on the combination of a first model 202 trained for a first domain and a second model 206 trained for a second domain. In certain aspects, first model 202 and second model 206 may comprise language models fine-tuned for the first domain and the second domain, respectively. For example, first model 202 may be a first language model fine-tuned on first domain data such that first model 202 is capable of generating first domain text and/or initiating or performing first domain tasks. As shown in FIG. 2, first model 202 includes sixteen weights 204 (e.g., shown as $W_{1\_1}$ through $W_{1\_16}$), which may have been adjusted during its fine-tuning, such as to improve first model 202's ability to make accurate predictions and/or perform tasks for the first domain. Each weight 204, 208 included in each of the first model 202 and the second model 206, respectively, may determine the strength of a corresponding connection, influencing how much input data from one node affects the output of another node which are connected via the connection in the model.

Second model 206 may be a second language model fine-tuned on second domain data such that second model 206 is capable of generating second domain text and/or initiating or performing second domain tasks. In this example, first model 202 and second model 206 may share a same architecture (e.g., a same number of nodes, layers, connections, and weights). Thus, as shown in FIG. 2, second model 206 also includes sixteen weights (e.g., shown as weights 208 ($W_{2\_1}$ through $W_{2\_16}$)), which may have been adjusted during its fine-tuning, such as to improve second model 206's ability to make accurate predictions and/or perform tasks for the second domain. A value of at least one of the sixteen weights 208 of the second model 206 (e.g., associated with at least a first connection between two nodes in the second model 206) may be different than a value of at least one of the sixteen weights 204 of the first model 202 (e.g., associated with at least the first connection between the same two nodes but in the first model 202).

Workflow 200 may be used to combine first model 202 and second model 206 into merged model 222, such that merged model 222 is a multi-domain model (e.g., associated with both the first domain and second domain) and/or a multi-task model (e.g., capable of performing both first and second domain-related tasks). Although workflow 200 illustrates the combination of only two models to create merged model 222, it is noted that in some other examples, workflow 200 may be similarly applied to create a merged model 222 from more than two models.

As shown in FIG. 2, workflow 200 begins with a gradient vector generation component 210 generating a gradient vector, referred to herein as "final gradient vector" for each model. For example, gradient vector generation component 210 may generate a final gradient vector 212 for first model 202 and a final gradient vector 214 for second model 206.

Final gradient vector 212 may indicate weight changes (WC) for one or more weights 204 of first model 202. For example, as shown, final gradient vector 212 includes a weight change associated with weight $W_{1\_1}$ of first model 202, a weight change associated with weight $W_{1\_2}$ of first model 202, a weight change associated with weight $W_{1\_3}$ of first model 202, and so on. Weight changes included in final gradient vector 212 generated for first model 202 may indicate weight changes that are needed to adjust the performance of model 202. For example, in certain aspects, the weight changes may indicate adjustments to weight(s) 204 of first model 202 that may degrade the performance of first model 202, or in some cases, cause first model 202 to be unable to effectively generate text and/or initiate and/or perform tasks for the first domain (e.g., such as provide incorrect answers to questions associated with the first domain).

Similarly, final gradient vector 214 may indicate weight changes (WC) for one or more weights 208 of second model 206. For example, as shown, final gradient vector 214 includes a weight change associated with weight $W_{2\_1}$ of second model 206, a weight change associated with weight $W_{2\_2}$ of second model 206, a weight change associated with weight $W_{2\_3}$ of second model 206, and so on. Weight changes included in final gradient vector 214 generated for second model 206 may indicate weight changes that are needed to adjust the performance of model 202. For example, in certain aspects, the weight changes may indicate adjustments to weight(s) 208 of second model 206 that may degrade the performance of second model 206, and more specifically in some cases, cause second model 206 to be unable to effectively generate text and/or initiate and/or perform tasks for the second domain (e.g., such as provide incorrect answers to questions associated with the second domain).

Additional details related to the generation of final gradient vectors, such as final gradient vector 212 for first model 202 and final gradient vector 214 for second model 206 in FIG. 2, are provided below with respect to FIG. 3.

Workflow 200 then proceeds with a model merging component 220 combining at least one weight 204, 208 of each of the first model 202 and the second model 206, respectively, to obtain merged model 222. As mentioned above, merged model 222 may be associated with the first domain and the second domain. In this example, merged model 222 includes sixteen weights 224 (e.g., shown as $W_{3\_1}$ through $W_{3\_16}$), which are based on one or more weights 204 of first model 202 and one or more weights 208 of second model 206.

In certain aspects, model merging component 220 determines which weights 204, 208 of first model 202 and second model 206, respectively, to combine (and which weights 204, 208 to ignore and/or drop), such as to obtain merged model 222, based on final gradient vector 212 generated for first model 202 and final gradient vector 214 generated for second model 206.

For example, in certain aspects, model merging component 220 may identify largest magnitude weight changes indicated in final gradient vectors 212 and 214. Largest magnitude weight changes included in final gradient vector 212 may be associated with weights 204 that are important and/or relevant to the performance of first model 202 with respect to the first domain (e.g., weights 204 that may need to be preserved during model merging to help ensure that first model 202 is able to run/perform correctly for the first domain). These weights 204 associated with the largest magnitude weight changes in final gradient vector 212 may be referred to as domain-sensitive weights of first model 202, and may be identified by model merging component 220. Similarly, the largest magnitude weight changes included in final gradient vector 214 may be associated with weights 208 that are important and/or relevant to the performance of second model 206 with respect to the second domain (e.g., weights 208 that may need to be preserved during model merging to help ensure that second model 206 is able to run/perform correctly for the second domain). These weights 208 associated with the largest magnitude weight changes in final gradient vector 214 may be referred to as domain-sensitive weights of second model 206, and may be identified by model merging component 220. In certain aspects, model merging component 220 may combine one or more domain-sensitive weights of first model 202 and one or more domain-sensitive weights of second model 206, and drop the remaining weights of each model 202, 206, when performing model merging. By first identifying the domain-sensitive weights of each model 202, 206, weights that are critical to model performance in the first and second domains may be preserved in merged model 222. Maintaining these weights when creating merged model 222 may help to ensure that merged model 222 is effective for use in the first and second domains (e.g., capable of generating output and/or performing tasks in the first domain and second domain).

In certain aspects, a greedy method may be used to select domain-sensitive weights associated with each of the first model 202 and the second model 206 that may be combined to generate merged model 222. For example, the top Z amount of domain-sensitive weights associated with first model 202 and second model 206 may be selected and combined to generated merged model 222. As another example, the top M amount of domain-sensitive weights associated with first model 202 and the top M amount of domain-sensitive weights associated with second model 206 may be identified and used to create merged model 222 (e.g., while other weights 204, 208 of models 202, 206 are dropped or ignored). Put differently, in this example, equal amounts of domain-sensitive weights may be identified (and selected) from each model 202, 206 to generate merged model 222. In some other examples, different amounts of domain-sensitive weights may be identified in each model 202, 206 to generate merged model 222.

In certain aspects (not shown in FIG. 2), an activation function may be applied to final gradient vector 212 generated for first model 202 to generate a first probability distribution for first model 202. Similarly, the activation function may be applied to final gradient vector 214 generated for second model 206 to generate a second probability distribution for second model 206. Example activation functions that may be applied to final gradient vector 212 and/or final gradient vector 214 include Softmax, normalized exponentials, a sigmoid function and normalization, and/or rectified linear unit (ReLU) and normalization, to name a few.

The first probability distribution may provide a distribution over the weights 204 of first model 202, while the second probability distribution may provide a distribution over the weights 208 of second model 206. Further, the first probability distribution for the first model 202 may be a probability distribution for randomly sampling the weights of first model 202, which may be merged, and the second probability distribution for the second model 206 may be a probability distribution for randomly sampling the weights of second model 206, which may be merged. Specifically, in certain aspects, random sampling may perform better than greedy selection when merging weights of the first model 202 and the second model 206 (e.g., such as due to the exploration of the search space).

In certain aspects, model merging component 220 may sample the weights of first model 202 and/or second model 206 for model merging using the first probability distribution and/or the second probability distribution, respectively. As an illustrative example, for three weights, w1, w2, and w3, a distribution of [0.2, 0.5, 0.3] may exist. To merge a single weight using this distribution, the three weights may be sampled such that weight w1 has a 20% change of being selected, weight w2 has a 50% change of being selected, and weight w3 has a 30% of being selected. This is different from greedy sampling where weight w2 may be simply selected due to weight w2 having a largest score.

Figure 3:
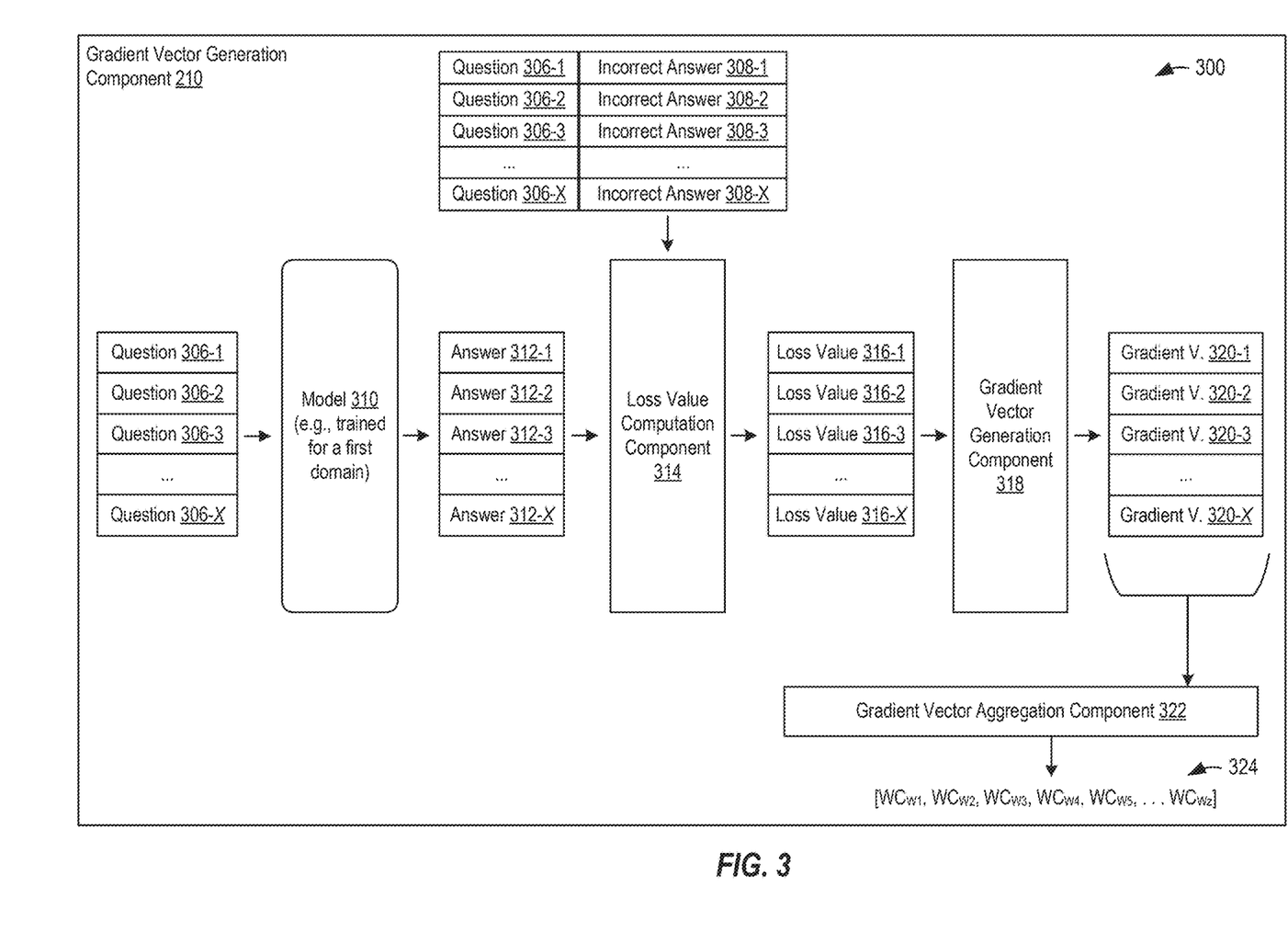
FIG. 3 depicts an example workflow for final gradient vector generation.

FIG. 3 depicts an example workflow 300 for final gradient vector generation. In certain aspects, workflow 300 may be performed by gradient vector generation component 210 to generate final gradient vector 212 for first model 202 and/or final gradient vector 214 for second model 206 in FIG. 2.

As shown in FIG. 3, workflow 300 begins with gradient vector generation component 210 obtaining a plurality of questions 306-1 through 306-X, where X is an integer greater than one (e.g., collectively referred to herein as "questions 306" and individually referred to herein as "question 306"). Further, for each question 306, gradient vector generation component 210 may obtain a corresponding incorrect answer 308 (e.g., shown in FIG. 3 as incorrect answers 308-1 through 308-X, which may be collectively referred to herein as "incorrect answers 308" and individually referred to herein as "incorrect answer 308"). Each question 306 and corresponding incorrect answer 308 may be associated with a specific domain, such as a first domain. For example, questions 306 and incorrect answers 308, obtained by gradient vector generation component 210 in FIG. 3, may be associated with a tax domain (e.g., include questions and answers related to the filing taxes, receiving tax credit, etc.).

In certain aspects, gradient vector generation component 210 may obtain questions 306 and/or incorrect answers 308 from a database, such as an existing open-source database of questions and corresponding incorrect answers. In certain aspects, gradient vector generation component 210 may obtain questions 306 and/or incorrect answers 308 based on prompting a language model to generate questions 306 and/or incorrect answers 308. For example, the language model may be prompted to process a corpus of text associated with the first domain and generate multiple questions 306 and multiple corresponding answers, including at least one incorrect answer 308 for each question 306. In certain aspects, answers generated by the language model may include multiple choice answers to each question 306, where at least one of the answers is correct and least one of the answers is incorrect.

Workflow 300 then proceeds with gradient vector generation component 210 prompting a model 310 to generate a plurality of answers 312-1 through 312-X (e.g., collectively referred to herein as "answers 312" and individually referred to herein as "answer 312") to questions 306. For example, model 310 may be prompted to generate an answer 312-1 (e.g., predict the correct answer) for question 306-1, generate an answer 312-2 for question 306-2, generate an answer 312-3 for question 306-3, and so on.

A loss value computation component 314 then computes loss values 316-1 through 316-X (e.g., collectively referred to herein as "loss values 316" and individually referred to herein as "loss value 316"). Each loss value 316 may be computed based on a comparison between (1) an answer 312 generated by model 310 in response to a question 306 and (2) an incorrect answer 308 to the question 306. For example, loss value computation component 314 may compute loss value 316-1 based on a comparison between answer 312-1 and incorrect answer 308-1, compute loss value 316-2 based on a comparison between answer 312-2 and incorrect answer 308-2, and so on. In certain aspects, loss value computation component 314 computes a loss value 316 using a cross-entropy loss function that is configured adjust the loss value 316 based on a comparison between an answer 312 and an incorrect answer 308, which are associated with a same question 306.

A gradient vector generation component 318 then generates gradient vectors 320-1 through 320-X (e.g., collectively referred to herein as "gradient vectors 320" and individually referred to herein as "gradient vector 320"). A gradient vector 320 may be generated for each answer 312 output by model 310 (e.g., in response to each question 306). That is, gradient vector 320-1 may be generated for answer 312-1, gradient vector 320-2 may be generated for answer 312-2, gradient vector 320-3 may be generated for answer 312-3, and so on. A gradient vector 320 generated for an answer 312 may indicate a weight change, for one or more weights of model 310, which may be needed to minimize the loss value 316 computed based on the answer 312. Put differently, a gradient vector 320 may include multiple weight changes, where each weight change (1) is associated with a weight of model 310 and (2) indicates how the associated weight needs to be changed (e.g., adjusted up or down) such that model 310 produces the incorrect answer 308 instead of the answer 312 produced by model 310 (e.g., for a question 306).

Workflow 300 then proceeds with a gradient vector aggregation component 322 adding together gradient vectors 320 (e.g., generated by gradient vector generation component 318) to generate a final gradient vector 324 for model 310. As an illustrative example, gradient vectors 320 may include a first gradient vector grad1=[0.1, −0.2, 0.05], a second gradient vector grad2=[0.05, −0.1, 0.02], and a third gradient vector grad3=[0.08, −0.15, 0.03]. Vector aggregation component 322 may generate the final gradient vector 324 for model 310 as a simple sum of:

$$total_{grad} = grad1 + grad2 + grad3$$

$$total_{grad} = [0.1+0.05+0.08, (-0.2)+(-0.1)+(-0.15), 0.05+0.02+0.03]$$

$$total_{grad} = [0.23, -0.45, 0.10]$$

The final gradient vector 324 may include multiple weight changes (WC), where each weight change (1) is associated with a weight of model 310 and (2) indicates how the associated weight of model 310 needs to be changed (e.g., adjusted up or down) such that model 310 is less capable to (or no longer capable of) effectively answer first domain-specific questions and/or perform first domain-specific tasks. Put differently, final gradient vector 324 may provide a weight update to one or more weights of model 310, which may cause model 310 performance (e.g., with respect to the first domain) to degrade from "good" to "poor," and thereby at least cause model 310 to produce incorrect answers to domain-specific questions.

In certain aspects, final gradient vector 324 may include various magnitude weight changes for multiples weights. In certain aspects, a larger weight change may indicate that an associated weight of model 310 is important for the performance of model 310 in the first domain (e.g., is likely associated with a domain-sensitive weight of model 310), while a smaller weight change may indicate that an associated weight of model 310 is less important for the performance of model 310 in the first domain (e.g., is not likely associated with a domain-sensitive weight of model 310).

Example Method for Model Merging

Figure 4:
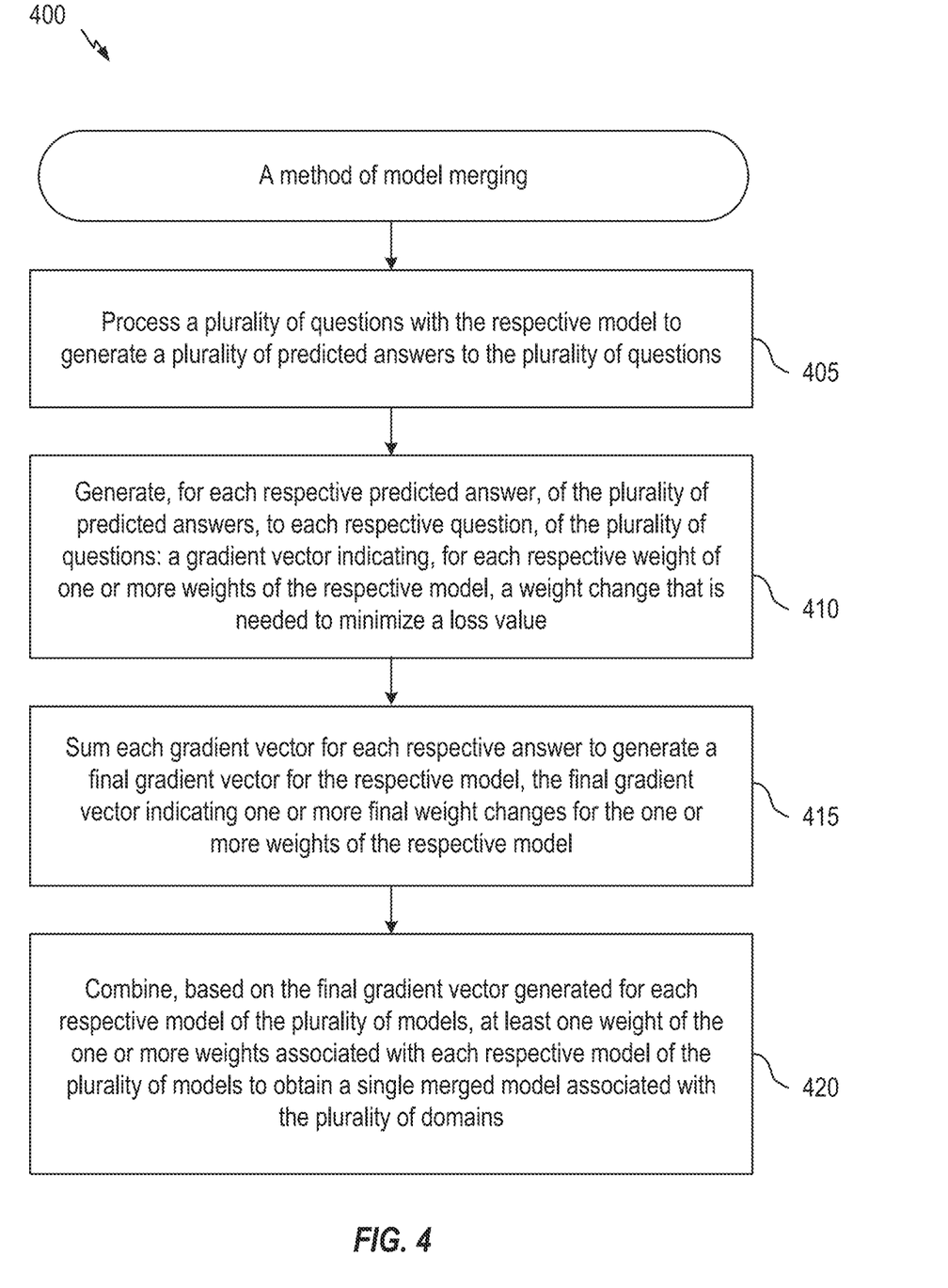
FIG. 4 depicts an example method of model merging.

FIG. 4 depicts an example method 400 for model merging. In one aspect, method 400 can be implemented by the system 100 of FIG. 1 and/or processing system 500 of FIG. 5.

Method 400 begins at block 405 with, for each respective model of a plurality of models trained for a plurality of domains, processing a plurality of questions with the respective model to generate a plurality of predicted answers to the plurality of questions.

Method 400 then proceeds to block 410 with, for each respective model of a plurality of models trained for a plurality of domains, generating, for each respective predicted answer, of the plurality of predicted answers, to each respective question, of the plurality of questions, a gradient vector indicating, for each respective weight of one or more weights of the respective model, a weight change that is needed to minimize a loss value, the loss value being based on the respective predicted answer and an incorrect answer to the respective question.

Method 400 then proceeds to block 415 with, for each respective model of a plurality of models trained for a plurality of domains, summing each gradient vector for each respective answer to generate a final gradient vector for the respective model, the final gradient vector indicating one or more final weight changes for the one or more weights of the respective model.

Method 400 then proceeds to block 420 with combining, based on the final gradient vector generated for each respective model of the plurality of models, at least one weight of the one or more weights associated with each respective model of the plurality of models to obtain a single merged model associated with the plurality of domains.

In some aspects, method 400 further includes performing, using the single merged model, one or more tasks associated with at least two domains of the plurality of domains.

In some aspects, method 400 further includes determining the loss value, for each respective predicted answer to each respective question, based on a cross-entropy loss function configured to adjust the loss value based on a comparison between the respective predicted answer and the incorrect answer to the respective question.

In some aspects, block 420 includes: identifying a subset of weights among the one or more weights associated with each respective model of the plurality of models, wherein each weight of the subset of weights is associated with a final weight change, among the one or more final weight changes indicated in the final gradient vector associated with each respective model, that satisfies a weight change threshold; and combining the subset of weights to obtain the single merged model.

In some aspects, block 420 includes: identifying a subset of weights among the one or more weights associated with each respective model of the plurality of models that are associated with a top threshold number of largest final weight changes among the one or more final weight changes indicated in the final gradient vector associated with each respective model; and combining the subset of weights to obtain the single merged model.

In some aspects, method 400 further includes applying an activation function to the final gradient vector generated for each respective model of a plurality of models to generate a plurality of probability distributions for the plurality of models, wherein block 420 includes combining the at least one weight of the one or more weights associated with each respective model of the plurality of models based on the plurality of probability distributions.

In some aspects, the plurality of models comprise: a first model comprising a first plurality of weights; and a second model comprising a second plurality of weights; and block 420 includes: determining a first weight change for a first weight of the first plurality of weights included in the final gradient vector for the first model is greater than a second weight change for a second weight of the second plurality of weights included in the final gradient vector for the second model, wherein the first weight and the second weight are associated with a same first model parameter; and creating the single merged model with the first weight associated with the first model parameter and not with the second weight.

In some aspects, the plurality of models comprise: a first model comprising a first plurality of weights; and a second model comprising a second plurality of weights, the first plurality of weights are associated with a first plurality of model parameters, and the second plurality of weights are associated with a second plurality of model parameters that are different than the first plurality of model parameters.

In some aspects, method 400 further includes obtaining the plurality of questions and the incorrect answer to each respective question of the plurality of questions from a database.

In some aspects, method 400 further includes prompting a language model to generate the plurality of questions and the incorrect answer to each respective question of the plurality of questions based on a corpus of domain-specific data.

In some aspects, the plurality of models share a same model architecture.

By leveraging method 400, such as for the creation of a merged model, significant technical advantages may be achieved. For example, method 400, when utilized, may offer a solution for efficiently and accurately identifying domain-sensitive weights of two or more constituent models using gradient vectors generated for the constituent models, such that these domain-sensitive weights may be prioritized and preserved during model merging. Preserving domain-sensitive weights during model merging may help to ensure that the merged model includes weights that are critical to the various domains and/or tasks performed by each of the constituent models individually. Accordingly, performance of the merged model may be enhanced when generating outputs and/or performing tasks for two or more domains.

Note that FIG. 4 is just one example of a method, and other methods including fewer, additional, or alternative operations are possible consistent with this disclosure.

Example Processing System for Model Merging

Figure 5:
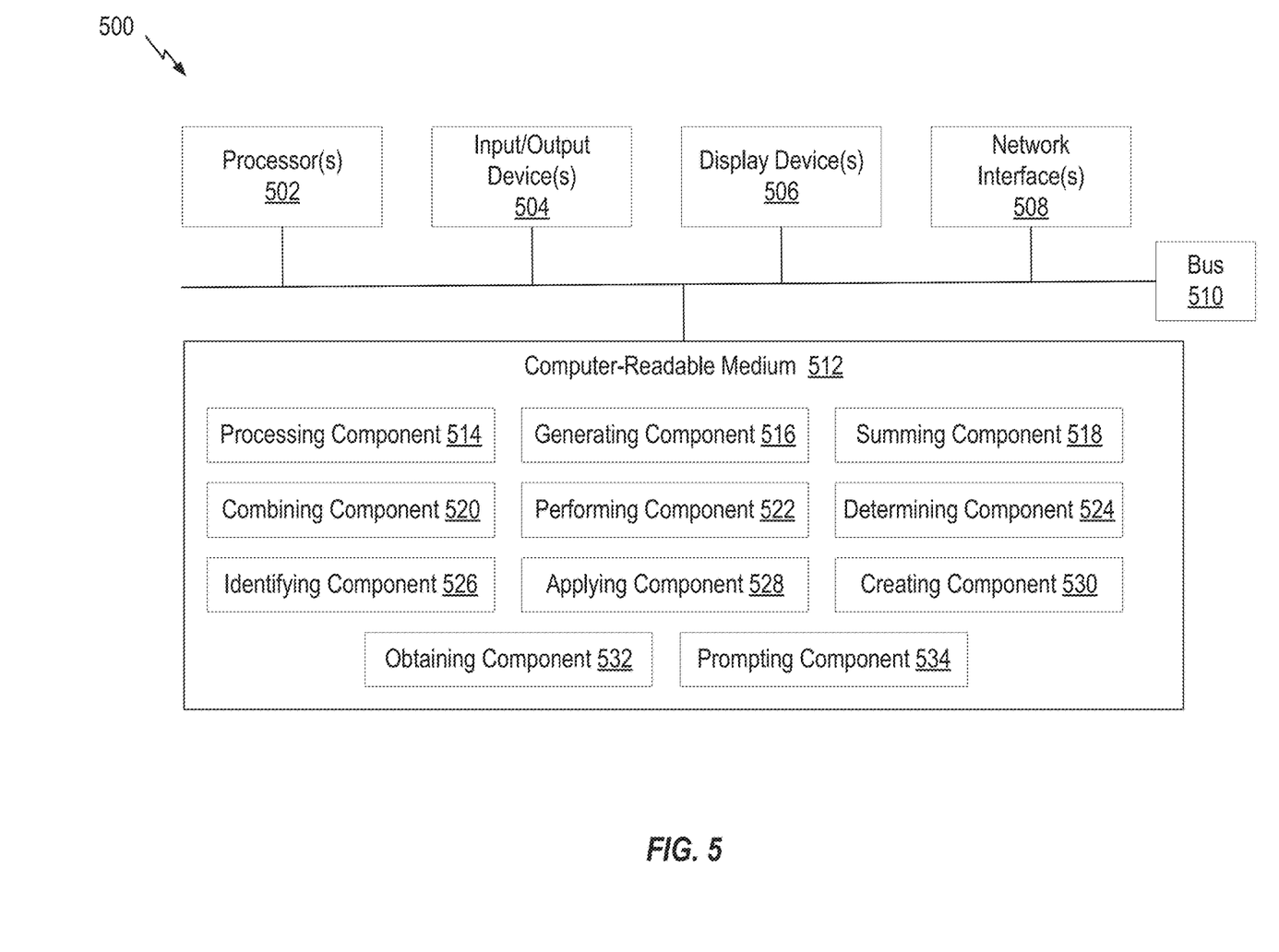
FIG. 5 depicts an example processing system with which aspects of the present disclosure can be performed.

FIG. 5 depicts an example processing system 500 configured to perform various aspects described herein, including, for example, method 400 as described above with respect to FIG. 4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of a one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes processing component 514, generating component 516, summing component 518, combining component 520, performing component 522, determining component 524, identifying component 526, applying component 528, creating component 530, obtaining component 532, and prompting component 534. Processing of the components 514-534 may enable and cause the processing system 500 to perform the method 400 described with respect to FIG. 4, or any aspect related to it.

In certain embodiments, for each respective model of a plurality of models trained for a plurality of domains, processing component 514 is configured to process, a plurality of questions with the respective model to generate a plurality of predicted answers to the plurality of questions. In certain embodiments, for each respective model of a plurality of models trained for a plurality of domains, generating component 516 is configured to generate, for each respective predicted answer, of the plurality of predicted answers, to each respective question, of the plurality of questions, a gradient vector indicating, for each respective weight of one or more weights of the respective model, a weight change that is needed to minimize a loss value, the loss value being based on the respective predicted answer and an incorrect answer to the respective question. In certain embodiments, for each respective model of a plurality of models trained for a plurality of domains, summing component 518 is configured to sum each gradient vector for each respective answer to generate a final gradient vector for the respective model, the final gradient vector indicating one or more final weight changes for the one or more weights of the respective model. In certain embodiments, combining component 520 is configured to combine, based on the final gradient vector generated for each respective model of the plurality of models, at least one weight of the one or more weights associated with each respective model of the plurality of models to obtain a single merged model associated with the plurality of domains.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method of model merging, comprising: for each respective model of a plurality of models trained for a plurality of domains: processing a plurality of questions with the respective model to generate a plurality of predicted answers to the plurality of questions; for each respective predicted answer, of the plurality of predicted answers, to each respective question, of the plurality of questions: generating a gradient vector indicating, for each respective weight of one or more weights of the respective model, a weight change that is needed to minimize a loss value, the loss value being based on the respective predicted answer and an incorrect answer to the respective question; summing each gradient vector for each respective answer to generate a final gradient vector for the respective model, the final gradient vector indicating one or more final weight changes for the one or more weights of the respective model; and combining, based on the final gradient vector generated for each respective model of the plurality of models, at least one weight of the one or more weights associated with each respective model of the plurality of models to obtain a single merged model associated with the plurality of domains.

Clause 2: The method of Clause 1, further comprising performing, using the single merged model, one or more tasks associated with at least two domains of the plurality of domains.

Clause 3: The method of any one of Clauses 1-2, further comprising determining the loss value, for each respective predicted answer to each respective question, based on a cross-entropy loss function configured to adjust the loss value based on a comparison between the respective predicted answer and the incorrect answer to the respective question.

Clause 4: The method of any one of Clauses 1-3, wherein combining, based on the final gradient vector generated for each respective model of the plurality of models, the at least one weight of the one or more weights associated with each respective model of the plurality of models comprises: identifying a subset of weights among the one or more weights associated with each respective model of the plurality of models, wherein each weight of the subset of weights is associated with a final weight change, among the one or more final weight changes indicated in the final gradient vector associated with each respective model, that satisfies a weight change threshold; and combining the subset of weights to obtain the single merged model.

Clause 5: The method of any one of Clauses 1-4, wherein combining, based on the final gradient vector generated for each respective model of the plurality of models, the at least one weight of the one or more weights associated with each respective model of the plurality of models comprises: identifying a subset of weights among the one or more weights associated with each respective model of the plurality of models that are associated with a top threshold number of largest final weight changes among the one or more final weight changes indicated in the final gradient vector associated with each respective model; and combining the subset of weights to obtain the single merged model.

Clause 6: The method of any one of Clauses 1-5, further comprising: applying an activation function to the final gradient vector generated for each respective model of a plurality of models to generate a plurality of probability distributions for the plurality of models, wherein combining, based on the final gradient vector generated for each respective model of the plurality of models, the at least one weight of the one or more weights associated with each respective model of the plurality of models comprises combining the at least one weight of the one or more weights associated with each respective model of the plurality of models based on the plurality of probability distributions.

Clause 7: The method of any one of Clauses 1-6, wherein: the plurality of models comprise: a first model comprising a first plurality of weights; and a second model comprising a second plurality of weights; and combining, based on the final gradient vector generated for each respective model of the plurality of models, the at least one weight of the one or more weights associated with each respective model of the plurality of models comprises: determining a first weight change for a first weight of the first plurality of weights included in the final gradient vector for the first model is greater than a second weight change for a second weight of the second plurality of weights included in the final gradient vector for the second model, wherein the first weight and the second weight are associated with a same first connection between a same two node; and creating the single merged model with the first weight associated with the first connection and not with the second weight.

Clause 8: The method of any one of Clauses 1-7, wherein: the plurality of models comprise: a first model comprising a first plurality of weights; and a second model comprising a second plurality of weights, and at least one first weight of the first plurality of weights is associated with a same first connection between a same two nodes in the first model as at least one second weight of the second plurality of weights in the second model.

Clause 9: The method of any one of Clauses 1-8, further comprising obtaining the plurality of questions and the incorrect answer to each respective question of the plurality of questions from a database.

Clause 10: The method of any one of Clauses 1-9, wherein the plurality of models share a same model architecture.

Clause 11: A processing system, comprising: memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of model merging, comprising:
for each respective model of a plurality of models trained for a plurality of domains:
processing a plurality of questions with the respective model to generate a plurality of predicted answers to the plurality of questions, wherein:
each respective model of the plurality of models is fine-tuned on a distinct domain-specific corpus, and
each respective question of the plurality of questions is a natural-language prompt;
for each respective predicted answer, of the plurality of predicted answers, to each respective question, of the plurality of questions:
determining a loss value based on a cross-entropy loss function configured to calculate the loss value based on a comparison between the respective predicted answer and an incorrect answer to the respective question; and
generating a gradient vector indicating, for each respective weight of one or more weights of the respective model, a weight change that is needed to minimize the loss value; and
summing each gradient vector for each respective answer to generate a final gradient vector for the respective model, the final gradient vector indicating one or more final weight changes for the one or more weights of the respective model;
combining, based on the final gradient vector generated for each respective model of the plurality of models, at least one weight of the one or more weights associated with each respective model of the plurality of models to obtain a single merged model associated with the plurality of domains; and
performing, using the single merged model, one or more heterogeneous tasks associated with at least two domains of the plurality of domains.

2. The method of claim 1, wherein combining, based on the final gradient vector generated for each respective model of the plurality of models, the at least one weight of the one or more weights associated with each respective model of the plurality of models comprises:
identifying a subset of weights among the one or more weights associated with each respective model of the plurality of models, wherein each weight of the subset of weights is associated with a final weight change, among the one or more final weight changes indicated in the final gradient vector associated with each respective model, that satisfies a weight change threshold; and
combining the subset of weights to obtain the single merged model.

3. The method of claim 1, wherein combining, based on the final gradient vector generated for each respective model of the plurality of models, the at least one weight of the one or more weights associated with each respective model of the plurality of models comprises:
identifying a subset of weights among the one or more weights associated with each respective model of the plurality of models that are associated with a top threshold number of largest final weight changes among the one or more final weight changes indicated in the final gradient vector associated with each respective model; and
combining the subset of weights to obtain the single merged model.

4. The method of claim 1, further comprising:
applying an activation function to the final gradient vector generated for each respective model of a plurality of models to generate a plurality of probability distributions for the plurality of models,
wherein combining, based on the final gradient vector generated for each respective model of the plurality of models, the at least one weight of the one or more weights associated with each respective model of the plurality of models comprises combining the at least one weight of the one or more weights associated with each respective model of the plurality of models based on the plurality of probability distributions.

5. The method of claim 4, wherein combining the at least one weight of the one or more weights associated with each respective model of the plurality of models based on the plurality of probability distributions comprises:
randomly sampling the at least one weight of the one or more weights associated with each respective model of the plurality of models based on the plurality of probability distributions; and
combining at least one weight of the one or more weights associated with each respective model of the plurality of models based on the plurality of probability distributions to obtain the single merged model.

6. The method of claim 1, wherein:
the plurality of models comprise:
a first model comprising a first plurality of weights; and
a second model comprising a second plurality of weights; and
combining, based on the final gradient vector generated for each respective model of the plurality of models, the at least one weight of the one or more weights associated with each respective model of the plurality of models comprises:
determining a first weight change for a first weight of the first plurality of weights included in the final gradient vector for the first model is greater than a second weight change for a second weight of the second plurality of weights included in the final gradient vector for the second model, wherein the first weight and the second weight are associated with a same first connection between a same two nodes; and
creating the single merged model with the first weight associated with the first connection and not with the second weight.

7. The method of claim 1, wherein:
the plurality of models comprise:
a first model comprising a first plurality of weights; and
a second model comprising a second plurality of weights, and
at least one first weight of the first plurality of weights is associated with a same first connection between a same two nodes in the first model as at least one second weight of the second plurality of weights in the second model.

8. The method of claim 1, further comprising prompting a language model to generate the plurality of questions and the incorrect answer to each respective question of the plurality of questions based on a corpus of domain-specific data.

9. The method of claim 8, wherein prompting the language model to generate the plurality of questions and the incorrect answer to each respective question of the plurality of questions based on a corpus of domain-specific data further comprises to generate multiple choice answers to each question of the plurality of questions, wherein at least one of the multiple choice answers is correct and at least one of the multiple choice answers is incorrect.

10. The method of claim 1, further comprising obtaining the plurality of questions and the incorrect answer to each respective question of the plurality of questions from a database.

11. A processing system, comprising: a memory comprising computer-executable instructions; and a processor configured to execute the computer-executable instructions and cause the processing system to:
for each respective model of a plurality of models trained for a plurality of domains:
process a plurality of questions with the respective model to generate a plurality of predicted answers to the plurality of questions, wherein:
each respective model of the plurality of models is fine-mined on a distinct domain-specific corpus, and
each respective question of the plurality of questions is a natural-language prompt;
for each respective predicted answer, of the plurality of predicted answers, to each respective question, of the plurality of questions:
determine a loss value based on a cross-entropy loss function configured to calculate the loss value based on a comparison between the respective answer and an incorrect answer to the respective question; and
generate a gradient vector indicating, for each respective weight of one or more weights of the respective model, a weight change that is needed to minimize the loss value; and
sum each gradient vector for each respective answer to generate a final gradient vector for the respective model, the final gradient vector indicating one or more final weight changes for the one or more weights of the respective model;
combine, based on the final gradient vector generated for each respective model of the plurality of models, at least one weight of the one or more weights associated with each respective model of the plurality of models to obtain a single merged model associated with the plurality of domains; and
perform, using the single merged model, one or more heterogeneous tasks associated with at least two domains of the plurality of domains.

12. The processing system of claim 11, wherein to cause the processing system to combine, based on the final gradient vector generated for each respective model of the plurality of models, the at least one weight of the one or more weights associated with each respective model of the plurality of models, the processor is configured to execute the computer-executable instructions and cause the processing system to:
identify a subset of weights among the one or more weights associated with each respective model of the plurality of models, wherein each weight of the subset of weights is associated with a final weight change, among the one or more final weight changes indicated in the final gradient vector associated with each respective model, that satisfies a weight change threshold; and
combine the subset of weights to obtain the single merged model.

13. The processing system of claim 11, wherein to cause the processing system to combine, based on the final gradient vector generated for each respective model of the plurality of models, the at least one weight of the one or more weights associated with each respective model of the plurality of models, the processor is configured to execute the computer-executable instructions and cause the processing system to:
identify a subset of weights among the one or more weights associated with each respective model of the plurality of models that are associated with a top threshold number of largest final weight changes among the one or more final weight changes indicated in the final gradient vector associated with each respective model; and
combine the subset of weights to obtain the single merged model.

14. The processing system of claim 11, wherein:
the processor is configured to execute the computer-executable instructions and cause the processing system to: apply an activation function to the final gradient vector generated for each respective model of a plurality of models to generate a plurality of probability distributions for the plurality of models, and
to cause the processing system to combine, based on the final gradient vector generated for each respective model of the plurality of models, the at least one weight of the one or more weights associated with each respective model of the plurality of models, the processor is configured to execute the computer-executable instructions and cause the processing system to combine the at least one weight of the one or more weights associated with each respective model of the plurality of models based on the plurality of probability distributions.

15. The processing system of claim 14, wherein to cause the processing system to combine the at least one weight of the one or more weights associated with each respective model of the plurality of models based on the plurality of probability distributions, the processor is configured to execute the computer-executable instructions and cause the processing system to:
randomly sample the at least one weight of the one or more weights associated with each respective model of the plurality of models based on the plurality of probability distributions; and
combine at least one weight of the one or more weights associated with each respective model of the plurality of models based on the plurality of probability distributions to obtain the single merged model.

16. The processing system of claim 11, wherein:
the plurality of models comprise:
a first model comprising a first plurality of weights; and
a second model comprising a second plurality of weights; and
to cause the processing system to combine, based on the final gradient vector generated for each respective model of the plurality of models, the at least one weight of the one or more weights associated with each respective model of the plurality of models, the processor is configured to execute the computer-executable instructions and cause the processing system to:
determine a first weight change for a first weight of the first plurality of weights included in the final gradient vector for the first model is greater than a second weight change for a second weight of the second plurality of weights included in the final gradient vector for the second model, wherein the first weight and the second weight are associated with a same first connection between a same two nodes; and create the single merged model with the first weight associated with the first connection and not with the second weight.

17. The processing system of claim 11, wherein:
the plurality of models comprise:
   a first model comprising a first plurality of weights; and
   a second model comprising a second plurality of weights, and
at least one first weight of the first plurality of weights is associated with a same first connection between a same two nodes in the first model as at least one second weight of the second plurality of weights in the second model.

18. The processing system of claim 11, wherein the processor is configured to execute the computer-executable instructions and cause the processing system to prompt a language model to generate the plurality of questions and the incorrect answer to each respective question of the plurality of questions based on a corpus of domain-specific data.

19. The processing system of claim 18, wherein to cause the processing system to prompt a language model to generate the plurality of questions and the incorrect answer to each respective question of the plurality of questions based on a corpus of domain-specific data, the processor is configured to execute the computer-executable instructions and cause the processing system to generate multiple choice answers to each question of the plurality of questions, wherein at least one of the multiple choice answers is correct and at least one of the multiple choice answers is incorrect.

20. The processing system of claim 11, wherein the processor is configured to execute the computer-executable instructions and cause the processing system to obtain the plurality of questions and the incorrect answer to each respective question of the plurality of questions from a database.

\* \* \* \* \*